March 10, 1953     H. B. HAMILTON     2,630,898
CLUTCH ADJUSTING SCREW
Filed Aug. 2, 1951
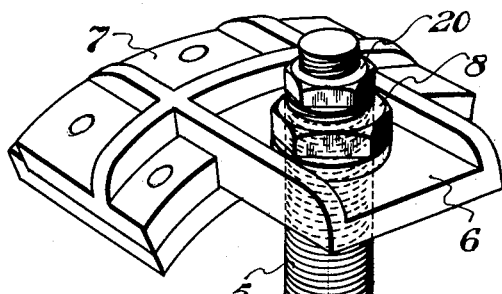
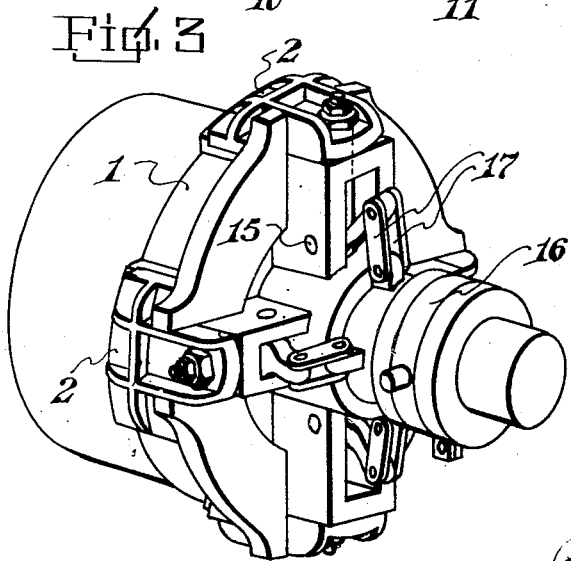
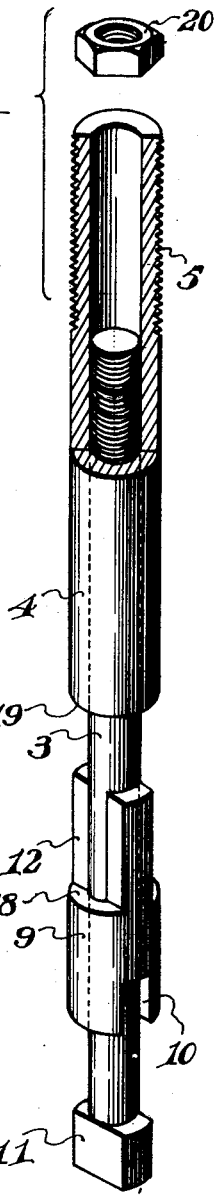
Herschel B. Hamilton
INVENTOR.
BY Philip A. H. Terrell
his Atty.

Patented Mar. 10, 1953

2,630,898

UNITED STATES PATENT OFFICE 2,630,898

CLUTCH ADJUSTING SCREW

Herschel B. Hamilton, Sapulpa, Okla.

Application August 2, 1951, Serial No. 239,913

2 Claims. (Cl. 192—111)

The invention relates to clutch adjusting screws of the type used in connection with Reid clutches, wherein clutch shoes are moved inwardly and outwardly for cooperating with a clutch drum, and has for its object to form the adjusting screws from a plurality of parts for preventing breaking of the adjusting screws, now the common difficulty experienced with devices of this kind, wherein the adjusting screws are formed from a single element having opposite flat surfaces for forming shoulders, with which shoulders the cam surfaces of the clutch arm cooperate.

A further object is to form a clutch shoe adjusting screw comprising a single bolt extending longitudinally through a sleeve carried by the clutch shoe and having its head in a bifurcation in the lower end of an auxiliary sleeve engaging the lower end of the sleeve, and forming a flat at opposite sides of the headed bolt intermediate its ends, and the cam surfaces of the clutch arm cooperating with the lower end of the sleeve in a manner whereby the bolt will not be fractured, incident to continuous operation of the cam arm.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a collective detail perspective view of the parts of the adjusting screw showing the same in positions assumed during assembly.

Figure 2 is a perspective view of the adjusting screw attached to a clutch shoe and assembled for operation by a clutch arm.

Figure 3 is a perspective view of a conventional form of Reid clutch, showing the adjusting screws applied thereto.

Referring to the drawing, the numeral 1 designates a clutch drum and 2 clutch shoes which cooperate with the drum in the usual manner. As all of the clutch shoes and adjusting screws are similar, one will be described in detail.

Heretofore, the adjusting screws have been made from a single piece of metal, provided with flats on opposite sides thereof for the reception of the clutch arm cam. It has been found that, when so constructed, the adjusting screw crystallizes and breaks at the upper ends of the flats where the upper cam surface of the clutch arm contacts the flats. The screw starts to break in the corners. This seems to be caused by a strained set up at these points each time the shoes are brought out and back. To completely overcome the breakage at this point, it has been found that an unbroken surface should be provided to overcome the corners, and by eliminating the corners there can be a flexing without a sharp corner which would start to break. To accomplish this result the adjusting screw comprises a headed bolt 3, extending the full length of the adjusting screw. Mounted on the outer end of the adjusting screw is a sleeve 4, the upper end of which sleeve is threaded at 5 through the lug 6 of the clutch shoe 7. Sleeve 4 is held in adjusted position by an adjusting nut 8 threaded on the outer end of the sleeve 4 and locks the sleeve 4 in adjusted position.

Disposed on the inner end of the headed bolt 3 is an inner sleeve 9 having its inner end bifurcated at 10 for the reception of the head 11 of the bolt 3. The opposite sides of the inner sleeve 9 are flattened as shown at 12 for forming the flats, and for positioning between the cams 13 of the clutch arm 14. Clutch arm 14 is standard equipment and is hingedly mounted at 15 and is controlled in the usual manner from the clutch collar 16 through the links 17. The outer end of the inner sleeve 9 engages the inner end of the outer sleeve 4, and the flats 12 form a shoulder 18, which, along with the inner end 19 of the sleeve 4, forms engaging surfaces with which the cams 13 cooperate for moving the clutch shoe 7 inwardly or outwardly. By the particular construction, it will be seen that the bolt 3 can flex and not a sharp ground corner is presented, which easily crystallizes and breaks as is the case when the device is made from a single piece of material.

Headed bolt 3 extends upwardly and projects from the outer end of the sleeve 4 and has threaded thereon a nut 20, which nut, when tightened, holds the inner sleeve 9 in close engagement with the inner end of the outer sleeve 4, and the head 11 of the bolt in the bifurcation 10, therefore it will be seen that a rigid structure is formed.

It will be noted that a very fine adjustment can be obtained, as the sleeve 4 can be rotated to the desired adjustment which is not possible where the device is made from a single piece of material, with flats on opposite sides, as it would be necessary to rotate the device at least 180 degrees, as the flats will not properly register for reception between the operating cams 13.

From the above it will be seen that a clutch adjusting screw is provided, constructed in a manner whereby breakage will be reduced to a minimum, finer adjustment obtained, and one wherein all ground corners are eliminated.

The invention having been set forth what is claimed as new and useful is:

1. An adjusting screw for a clutch shoe reciprocated by a cam arm having spaced cams, said adjusting screw comprising an outer sleeve threaded into the clutch shoe, a headed bolt extending through said outer sleeve and anchored to the shoe, an inner sleeve on the inner end of the headed bolt, the head of the headed bolt being disposed in notches of the inner end of the inner sleeve, the outer end of the inner sleeve engaging the inner end of the outer sleeve opposite sides of the outer end of the inner sleeve being flattened thereby forming shoulders with which sides of the cams engage, the inner end of the outer sleeve forming shoulders with which the cams engage, the outer end of the headed bolt being threaded and a nut threaded on the outer end of the bolt and cooperating with the outer end of the outer sleeve for holding the head of the headed bolt in the notches of the inner sleeve.

2. An adjusting screw connection between a clutch shoe and spaced cams of a clutch cam arm, said connection comprising a headed bolt, inner and outer sleeves through which said bolt extends, the outer sleeve being anchored to the clutch shoe, interengaging means between the headed bolt and the inner sleeve, the outer end of the inner sleeve having its opposite sides recessed thereby forming cooperating cam engaging shoulders on the inner sleeve and the inner end of the outer sleeve with which the spaced cams cooperate and means cooperating with the headed bolt for holding said sleeves in rigid abutting engagement.

HERSCHEL B. HAMILTON.

REFERENCES CITED

The following references are of record in the file of this patent:

UNITED STATES PATENTS

| Number | Name | Date |
| --- | --- | --- |
| 607,531 | Thomas | July 19, 1898 |
| 1,340,559 | Rhoades | May 18, 1920 |
| 1,426,213 | Pierce | Aug. 15, 1922 |
| 1,497,743 | Simons | June 17, 1924 |
| 1,584,563 | Knykendall | May 11, 1926 |